United States Patent
Messing et al.

(10) Patent No.: US 11,459,013 B2
(45) Date of Patent: Oct. 4, 2022

(54) STEERING COLUMN TURNING TORQUE ADJUSTMENT DEVICE

(71) Applicant: Steering Solutions IP Holding Corporation, Saginaw, MI (US)

(72) Inventors: Matthew L. Messing, Saginaw, MI (US); Robert J. Smith, Midland, MI (US); Clinton D. Spencer, Grand Blanc, MI (US); Brandon M. McComb, Burton, MI (US); Jacob A. Caverly, Freeland, MI (US); Douglas M. Schneider, Frankenmuth, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 565 days.

(21) Appl. No.: 16/509,115

(22) Filed: Jul. 11, 2019

(65) Prior Publication Data
US 2021/0010535 A1 Jan. 14, 2021

(51) Int. Cl.
*B62D 1/16* (2006.01)
*F16C 27/04* (2006.01)
*F16C 19/02* (2006.01)

(52) U.S. Cl.
CPC .............. *B62D 1/16* (2013.01); *F16C 19/02* (2013.01); *F16C 27/04* (2013.01); *F16C 2326/24* (2013.01)

(58) Field of Classification Search
CPC .. B62D 1/16; B62D 1/04; B62D 1/185; F16C 2326/24; F16C 27/04
See application file for complete search history.

(56) References Cited

U.S. PATENT DOCUMENTS

| | | | | |
|---|---|---|---|---|
| 4,514,109 A | * | 4/1985 | McKenna | F16C 35/073 403/370 |
| 4,979,834 A | * | 12/1990 | Speich | F16C 25/08 384/510 |
| 5,609,423 A | * | 3/1997 | Jurik | B62D 1/16 384/518 |
| 5,720,102 A | * | 2/1998 | McClanahan | F16C 3/03 29/898.12 |
| 5,829,891 A | * | 11/1998 | Beaman | F16C 25/083 384/495 |
| 5,975,766 A | * | 11/1999 | Cau | F16C 35/073 384/538 |
| 7,682,086 B2 | * | 3/2010 | Budaker | F16C 27/066 384/536 |
| 2002/0017155 A1 | * | 2/2002 | Aota | F16C 33/306 74/492 |
| 2005/0044980 A1 | * | 3/2005 | Minamoto | F16D 3/06 74/493 |
| 2016/0355207 A1 | * | 12/2016 | Urushibata | G05G 5/05 |
| 2019/0390709 A1 | * | 12/2019 | Domig | B62D 1/16 |

FOREIGN PATENT DOCUMENTS

WO WO-2011161492 A1 * 12/2011 ............ F16C 41/001

* cited by examiner

*Primary Examiner* — Frank B Vanaman
(74) *Attorney, Agent, or Firm* — Dickinson Wright PLLC

(57) ABSTRACT

A steering column assembly includes a steering column housing. The steering column assembly also includes a lower shaft disposed within the steering column housing and axially adjustable. The steering column assembly further includes a torque adjustment assembly operatively connected to the lower shaft to increase or decrease a steering shaft turning torque.

20 Claims, 4 Drawing Sheets

STEERING COLUMN TURNING TORQUE ADJUSTMENT DEVICE

BACKGROUND

A vehicle may be provided with a steering column assembly. The steering column assembly is provided with a feature or a mechanism that can adjust turning torque within a narrow range. The feature or mechanism incorporates a torque adjustment assembly to increase or decrease a steering shaft torque.

SUMMARY

According to one aspect of the disclosure, a steering column assembly includes a steering column housing. The steering column assembly also includes a lower shaft disposed within the steering column housing and axially adjustable. The steering column assembly further includes a torque adjustment assembly operatively connected to the lower shaft to increase or decrease a steering shaft turning torque.

According to another aspect of the disclosure, a steering column assembly includes a steering column housing. The steering column assembly also includes a lower shaft received within the steering column housing. The steering column assembly further includes a torque adjustment assembly to increase or decrease a steering shaft torque, the torque adjustment assembly being integrated with a lower bearing sleeve, the torque adjustment assembly having a spring in frictional contact with a receiving portion of the lower bearing sleeve.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
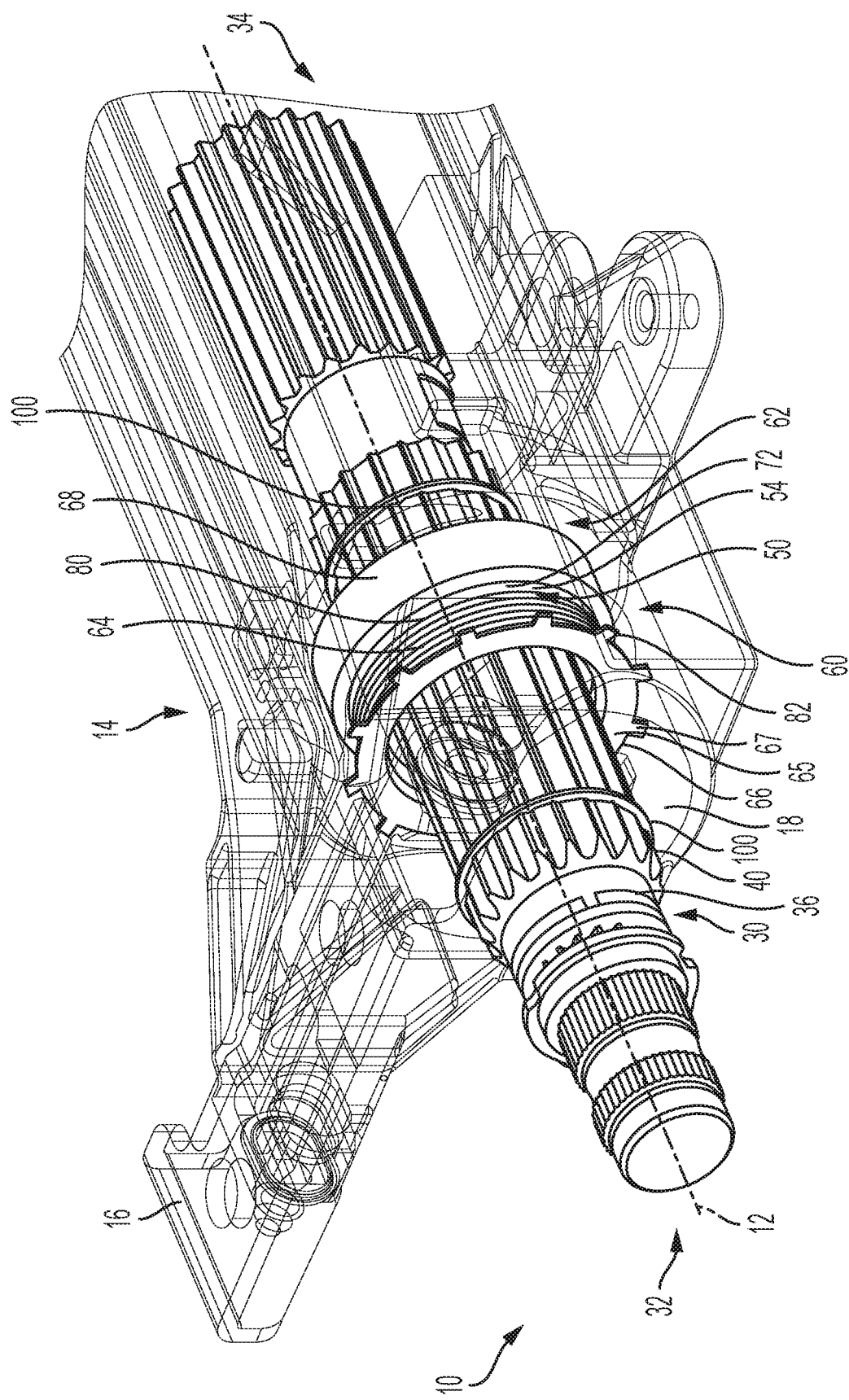
FIG. 1 is a perspective partial cross sectional view of a steering column assembly.
Figure 2:
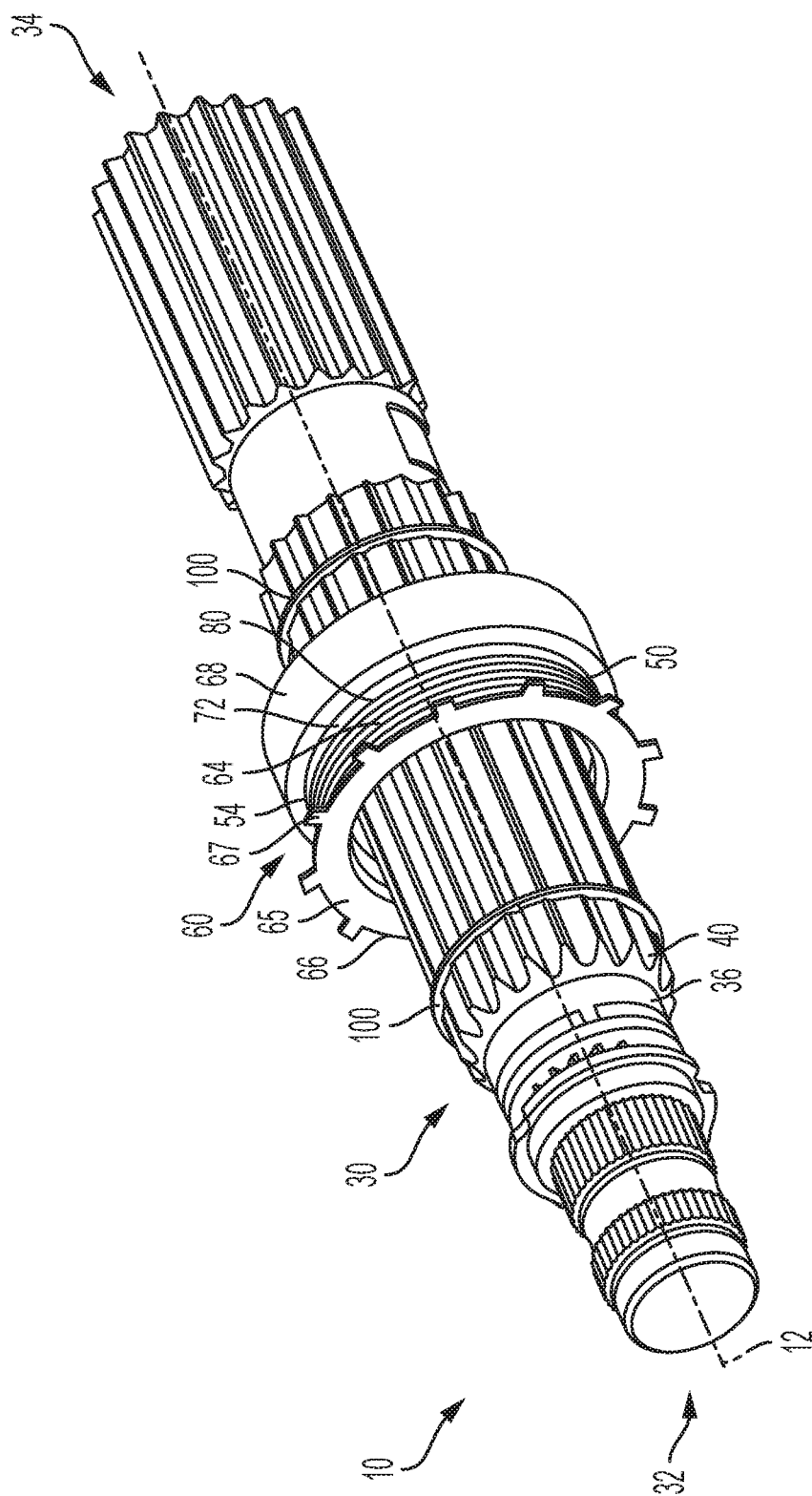
FIG. 2 is a perspective view of a lower shaft including a torque adjustment assembly.

Referring to FIGS. 1 and 2, a steering column assembly 10 is shown. The steering column assembly 10 is for a vehicle (not shown) and extends along a longitudinal axis 12. The steering column assembly 10 includes a steering column assembly housing 14. The steering column assembly housing 14 has a mounting feature 16 allowing the steering column assembly 10 to be mounted to a vehicle structure (not shown).

The steering column assembly housing 14 includes a central opening 18 through which a lower shaft 30 is at least partially received. The lower shaft 30 has a first end 32 and a second end 34. The first end 32 is operatively connected to an intermediate shaft (not shown). The second end 34 of the lower shaft 30 is fully received within the steering column housing 14. The lower shaft 30 further includes an outer surface 36. In some embodiments the outer surface 36 of the lower shaft 30 may have splines 40.

The steering column assembly 10 further includes a lower bearing sleeve 50. The lower bearing sleeve 50 has an inner surface 52 (FIGS. 3 and 4) and an outer surface 54. The inner surface 52 of the lower bearing sleeve 50 is in contact with the outer surface 36 of the lower shaft 30. The inner surface 52 of the lower bearing sleeve 50 has a set of ribs 56 which mate with the splines 40 of outer surface 36 of the lower shaft 30 so when the lower shaft 30 rotates the lower bearing sleeve 56 rotates as well. In other words, the lower shaft 30 and the lower bearing sleeve 50 are rotationally coupled to each other. However, the lower shaft 30 is axially adjustable relative to the lower bearing sleeve 50 to allow translation of the lower shaft 30 for assembly purposes.

The outer surface 54 of the lower bearing sleeve 50 is in contact with a torque adjustment assembly 60. The torque adjustment assembly 60 is integrated with the lower bearing sleeve 50. The torque adjustment assembly 60 includes the bearing assembly 61, a spring 64 and a retaining member 65. The bearing assembly includes a bearing housing 62, an outer race 68, and an inner race 70 (See FIGS. 3 and 4). The torque adjustment assembly 60 is held in a fixed position due to an interference press fit of the outer race 68 of the bearing assembly 61 and the housing 14, regardless of the increased or decreased load being applied.

The spring 64 of the torque adjustment assembly 60 has a first end 80 and a second end 82 opposite the first end 80. The first end 80 of the spring 82 is in contact with the lower bearing sleeve 50. The second end 82 of the spring 82 is in contact with the retaining member 65 of the torque adjustment assembly 60.

The retaining member 65 of the torque adjustment assembly 60 has an outer circumference 66 with a set of attachment points 67, with the attachment points 67 in contact with at least one of the steering column assembly housing 10 and the lower hearing sleeve 50.

The spring 64 is used to increase or decrease torque by increasing or decreasing friction between a receiving portion 72 of the lower bearing sleeve 50 and the first end 80 of the spring 82. Friction between the receiving portion 72 of the lower bearing sleeve 50 and the first end 80 of the spring 82 is increased when an increased load is applied by the spring 64 to the receiving portion 72 of the lower bearing sleeve 50. Friction between the receiving portion 72 of the lower bearing sleeve 50 and the first end 80 of the spring 82 is decreased when a decreased load is applied by the spring 64 to the receiving portion 72 of the lower bearing sleeve 50.

Located on each side of the torque adjustment assembly 60 is a respective retaining ring, collectively referred to as the retaining rings 100. The retaining ring 100 has a central opening through which the lower shaft 30 is inserted. The retaining rings 100 are separated a predetermined distance to allow for the lower shaft 30 to stroke (i.e., translate), which may be desirable by a customer during an assembly process, and to allow for rotation of the lower shaft 30 from steering.

Figure 3:
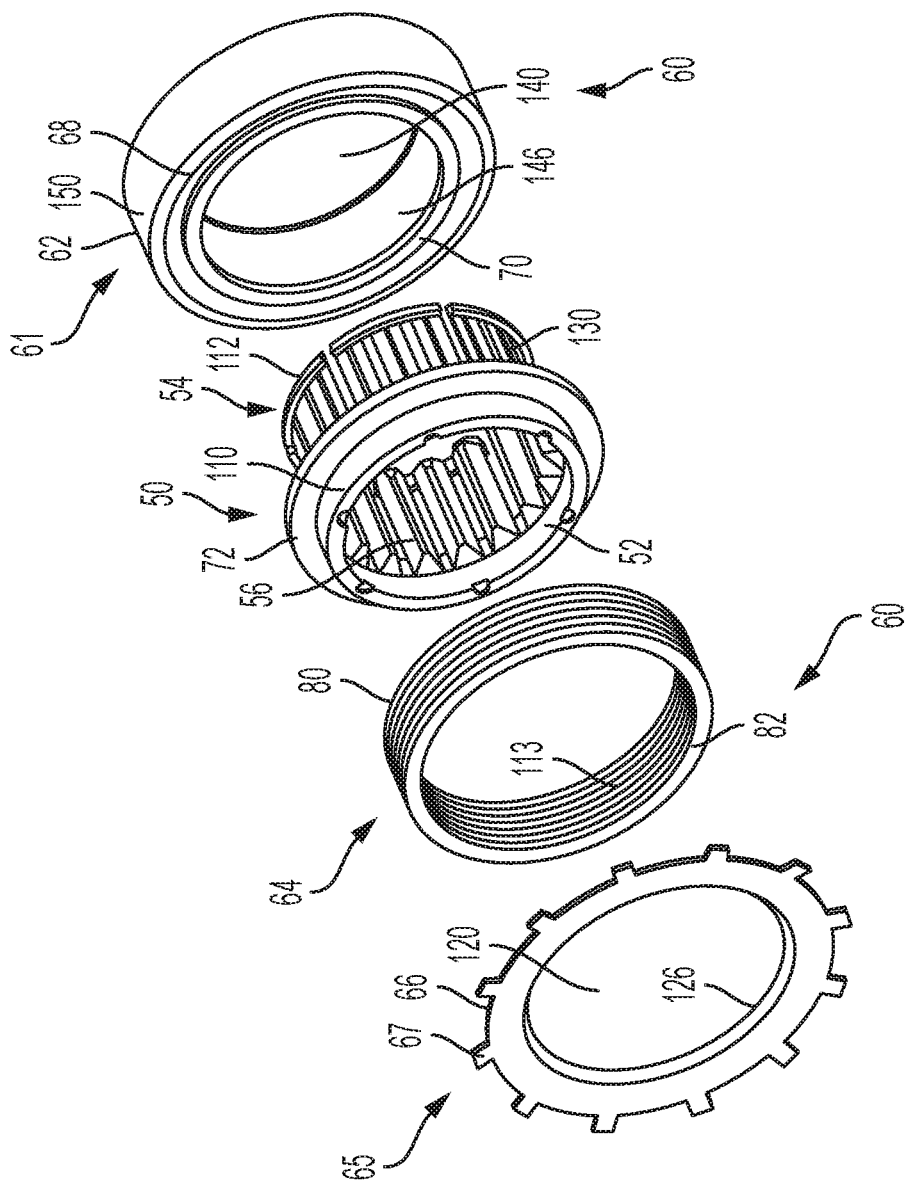
FIG. 3 is a disassembled view of the torque adjustment assembly.

Referring to FIG. 3 a disassembled view of the torque adjustment assembly 60 along with the lower bearing sleeve 50 is shown. When assembled the torque adjustment assembly 60 is fully integrated with the lower bearing sleeve 50. This integration is assisted by a spring retaining lip 110 and an outer retaining lip 112 on the lower bearing sleeve 50.

When assembled the spring retaining lip 110 of the lower bearing sleeve 50 is in contact with an inner surface 113 of the spring 64 of the torque adjustment assembly 60. This contact gives stability between the interaction of the spring 64 and the lower bearing sleeve 50. The first end 80 of the spring 64 is also in frictional contact with the lower bearing sleeve 50 at its receiving portion 72. This contact point is where the load on the lower bearing sleeve 50 is increased and decreased thus increasing or decreasing torque.

The retaining member 65 of the torque adjustment assembly 60 is in contact with the second end 82 of the spring 64. The retaining member 65 has a central opening 120 through which the lower shaft 30 passes through when the steering column assembly 10 is fully assembled. The retaining member 65 is also shown having the set of multiple attachment points 67. The attachment points 67 are projections from the outer circumference 66 of the retaining member 65. The attachment points 67 are in contact with at least one of the steering column assembly housing 14 and the lower bearing sleeve 50. The retaining member 65 further includes a retaining lip 126 surrounding its central opening 120. The retaining lip 126 is in contact with the inner surface 113 of the spring 64 when fully assembled to help hold the spring 64 in place in relation to the rest of the torque adjustment assembly 60.

The bearing housing sits within a recess 130 of the lower bearing sleeve 50. The recess 130 of the lower bearing sleeve 50 is a space formed between the receiving portion 72 of the lower bearing sleeve 50 and the outer retaining lip 112. The outer retaining lip 112 is a slight protrusion which holds the bearing housing 62 within the recess 130 of the lower bearing sleeve 50.

The bearing housing 62 is shown having the outer race 68 the inner race 70 and a central opening 140 through which the lower shaft 30 and the lower bearing sleeve 50 pass through when the steering column assembly 10 is fully assembled. The central opening 140 of the bearing housing 62 is circumferentially surrounded by the inner race 70 of the bearing housing 62. The inner race 70 is circumferentially surrounded by the outer race 68.

Figure 4:
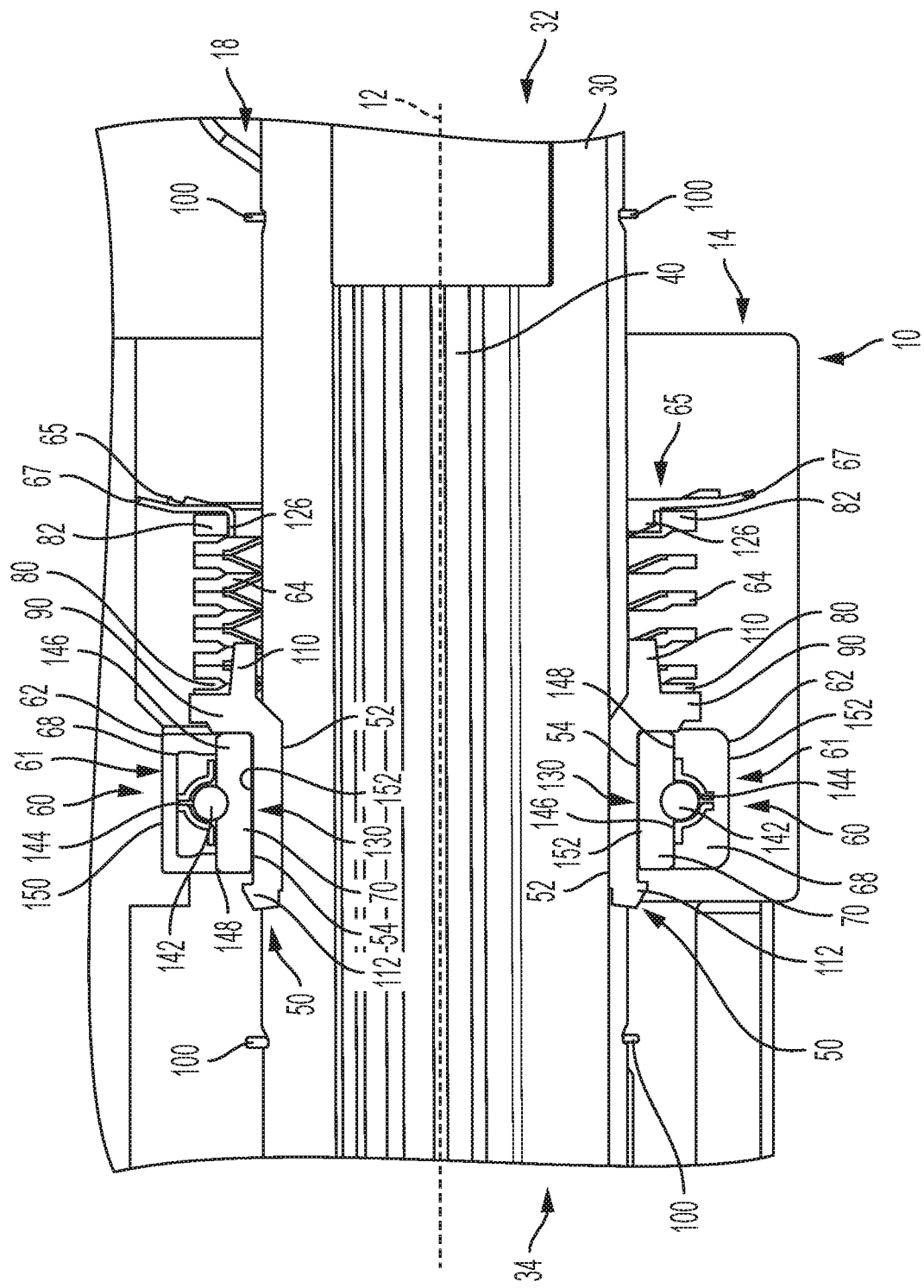
FIG. 4 is a partial cross sectional view of the steering column assembly with the torque adjustment assembly.

Referring to FIG. 4 a cross-sectional view of the steering column assembly 10 with the torque adjustment assembly 60 is shown. The lower shaft 30 of the steering column assembly 10 is shown at least partially inserted through the central opening 18 of the steering column assembly housing 14.

The steering column assembly 10 is shown with the lower bearing sleeve 50 wrapped around the outer surface 36 of the lower shaft 30. The inner surface 52 of the lower bearing sleeve 50 is in contact with the outer surface 36 of the lower shaft 30. In this embodiment the lower shaft 30 is shown having the splined 40 outer surface 36. The outer surface 54 of the lower bearing sleeve 50 is in contact with a torque adjustment assembly 60.

The torque adjustment assembly 60 is shown with the bearing housing 62, the spring 64 and the retaining member 65 all fully assembled around the lower bearing sleeve 50 and the lower shaft 30. Within the bearing housing 62 is a bearing 142. The bearing 142 is located in a space 144 between an inner surface 146 of the inner race 70 and an inner surface 148 of the outer race 68. The bearing 142 allows for movement between the inner race 70 and the outer race 68 of the bearing housing 62. The outer race 68 of the bearing housing 62 has an outer surface 150 which is in contact with the steering column assembly housing 14 and the inner surface 148 which is in contact with an inner surface 146 of the inner race 70 and the space 144 wherein the bearing 142 is located. The inner race 70 includes an outer surface 148 which is in contact with the outer surface 54 of the lower bearing sleeve 50.

The fully assembled view shown in FIG. 4 shows the torque adjustment assembly 60 fully integrated with the lower bearing sleeve 50. The outer retaining lip 112 and a receiving portion 72 are shown on opposite ends of the recess 130 of the lower bearing sleeve 50. The bearing housing 62 is shown as received within the recess 130 of the lower bearing sleeve 50. The spring retaining lip 110 is in contact with the inner surface 113 of the spring 64. The frictional contact between the receiving portion 72 of the lower bearing sleeve and the first end 80 of the spring 64 provides the torque adjustment, while the contact between the spring retaining lip 110 and the inner surface 113 of the spring 64 provides stability when the spring 64 is applying pressure increasing the friction with the lower bearing sleeve 50.

The retaining member 65 of the torque adjustment assembly 60 is in contact with the second end 82 of the spring 64. Lower shaft 30 is shown passing through the central opening 120 of the retaining member 65. The attachment points 67 of the retaining member 65 are in contact with the steering column assembly housing 14. The retaining lip 126 around the central opening 120 is in contact with the inner surface 113 of the spring 64 to help hold the spring 64 in place in relation to the rest of the torque adjustment assembly 60.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the present disclosure, it is claimed:

1. A steering column assembly comprising:
   a steering column housing;
   a lower shaft disposed within the steering column housing and axially adjustable; and
   a torque adjustment assembly operatively connected to the lower shaft to increase or decrease a steering shaft turning torque, wherein the torque adjustment assembly comprises a bearing assembly, a retaining member, and a spring disposed between the bearing assembly and the retaining member, wherein the bearing assembly comprises an outer race, an inner race, and at least one bearing disposed within a space defined by the outer race and the inner race, wherein the inner race of the bearing assembly is in contact with a recess of a lower bearing sleeve, the recess being on an outer surface of the lower bearing sleeve, the recess defined by a receiving portion and an outer retaining lip of the lower bearing sleeve.

2. The steering column assembly of claim 1, wherein the torque adjustment assembly is integrated with the lower bearing sleeve.

3. The steering column assembly of claim 1, wherein the spring has a first end and a second end, the first end in frictional contact with the receiving portion of the lower bearing sleeve, the second end opposite the first end and in contact with the retaining member.

4. The steering column assembly of claim 1, wherein the spring is held in place relative to the rest of the torque adjustment assembly by a spring retaining lip of the lower bearing sleeve, the spring retaining lip being in contact with an inner surface of the spring.

5. The steering column assembly of claim 1, wherein the retaining member has a retaining lip around a central opening of the retaining member, the retaining lip being in contact with an inner surface of the spring.

6. The steering column assembly of claim 1, wherein the lower bearing sleeve is rotationally fixed relative to the lower shaft by engagement between splines on an outer surface of the lower shaft and ribs on an inner surface of the lower bearing sleeve.

7. The steering column assembly of claim 6, wherein the lower shaft is axially adjustable relative to the lower bearing sleeve.

8. The steering column assembly of claim 1, wherein the torque adjustment assembly is fixed to the steering column housing with an interference fit between an outer race of a bearing assembly and an inner surface of the steering column housing.

9. A steering column assembly comprising:
a steering column housing;
a lower shaft disposed within the steering column housing and axially adjustable; and
a torque adjustment assembly operatively connected to the lower shaft to increase or decrease a steering shaft turning torque, wherein the torque adjustment assembly comprises a bearing assembly, a retaining member, and a spring disposed between the bearing assembly and the retaining member, wherein the retaining member has an outer circumference with a set of attachment points, the attachment points being in contact with at least one of the steering column assembly housing and a lower bearing sleeve.

10. The steering column assembly of claim 9, wherein the torque adjustment assembly is integrated with the lower bearing sleeve.

11. The steering column assembly of claim 9, wherein the spring is held in place relative to the rest of the torque adjustment assembly by a spring retaining lip of the lower bearing sleeve, the spring retaining lip being in contact with an inner surface of the spring.

12. The steering column assembly of claim 9, wherein the retaining member has a retaining lip around a central opening of the retaining member, the retaining lip being in contact with an inner surface of the spring.

13. The steering column assembly of claim 9, wherein the lower bearing sleeve is rotationally fixed relative to the lower shaft by engagement between splines on an outer surface of the lower shaft and ribs on an inner surface of the lower bearing sleeve.

14. The steering column assembly of claim 9, wherein the torque adjustment assembly is fixed to the steering column housing with an interference fit between an outer race of a bearing assembly and an inner surface of the steering column housing.

15. A steering column assembly comprising:
a steering column housing;
a lower shaft received within the steering column housing; and
a torque adjustment assembly to increase or decrease a steering shaft torque, the torque adjustment assembly being integrated with a lower bearing sleeve, the torque adjustment assembly having a spring in frictional contact with a receiving portion of the lower bearing sleeve, wherein the spring is held in place relative to the rest of the torque adjustment assembly by a spring retaining lip of the lower bearing sleeve, the spring retaining lip being in contact with an inner surface of the spring and a retaining member in contact with a second end of the spring, the second end being opposite a first end of the spring, wherein the retaining member has an outer circumference with a set of attachment points, the attachment points being in contact with the steering column housing.

16. The steering column assembly of claim 15, wherein the lower bearing sleeve is rotationally fixed relative to the lower shaft by engagement between splines on an outer surface of the lower shaft and ribs on an inner surface of the lower bearing sleeve.

17. The steering column assembly of claim 16, wherein the lower shaft is axially adjustable relative to the lower bearing sleeve.

18. The steering column assembly of claim 15, wherein the torque adjustment assembly is fixed to the steering column housing with an interference fit between an outer race of a bearing assembly and an inner surface of the steering column housing.

19. A steering column assembly comprising:
a steering column housing;
a lower shaft received within the steering column housing; and
a torque adjustment assembly to increase or decrease a steering shaft torque, the torque adjustment assembly being integrated with a lower bearing sleeve, the torque adjustment assembly having a spring in frictional contact with a receiving portion of the lower bearing sleeve, wherein the torque adjustment assembly includes a bearing assembly located within a recess of an outer surface of the lower bearing sleeve, the recess defined by the receiving portion of the lower bearing sleeve and an outer retaining lip of the lower bearing sleeve.

20. The steering column assembly of claim 19, wherein the bearing assembly comprises an outer race, an inner race, and at least one bearing disposed within a space defined by the outer race and the inner race.

* * * * *